UNITED STATES PATENT OFFICE.

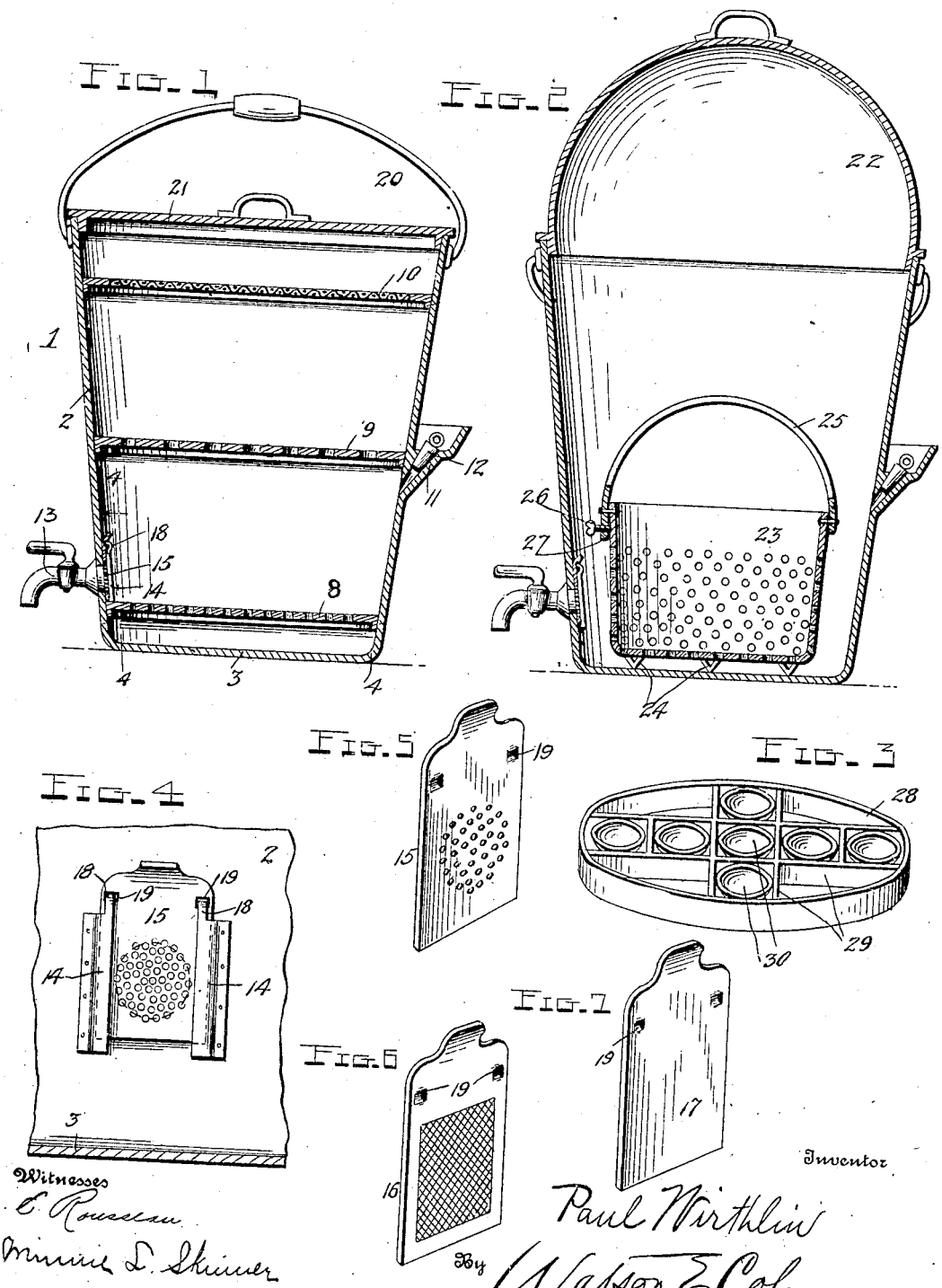

PAUL WIRTHLIN, OF EUREKA, UTAH.

CULINARY UTENSIL.

No. 881,988.  Specification of Letters Patent.  Patented March 17, 1908.

Application filed September 5, 1907. Serial No. 391,482.

*To all whom it may concern:*

Be it known that I, PAUL WIRTHLIN, a citizen of the United States, residing at Eureka, in the county of Juab and State of Utah, have invented certain new and useful Improvements in Culinary Utensils, of which the following is a specification, reference being had to the accompanying drawings.

My invention relates to improvements in culinary utensils for steaming, cooking and warming different kinds of foods, and it consists in the novel construction and the combination and arrangement of parts hereinafter described and claimed.

The object of the invention is to provide a utensil of this character which will be simple and inexpensive in construction, and which may be conveniently and effectively used for doing various kinds of cooking.

The above and other objects which will appear as the nature of the invention is better understood, are attained in the preferred embodiment of the invention illustrated in the accompanying drawings, in which Figure 1 is a vertical sectional view through my improved culinary utensil or steamer; Fig. 2 is a similar view showing a different arrangement of its interior parts and a different form of cover; Fig. 3 is a detail perspective of a removable tray for supporting eggs, cups of custard and the like within the steamer; Fig. 4 is a detail section taken on the plane of the line 4—4 in Fig. 1; Figs. 5 and 6 are perspective views of different forms of strainers and Fig. 7 is a similar view of a plate or closure which may be substituted for one of the strainers.

In the drawings 1 denotes my improved steamer or cooker which is preferably in the form of a cylindrical body or pot having its side wall 2 inclined downwardly and its flat bottom 3 united to said side wall by a rounded or curved edge 4. This construction dispenses with angular edges and corners within the pot and enables it to be readily cleaned. Within the pot are arranged three removable trays 8, 9, 10, each of which has a surrounding depending flange adapted to engage the inner face of the wall 2 and thereby support the tray. These trays are of different diameters so that they will be supported at different elevations within the pot. The tray 8 is the smallest and is of such diameter that it will be supported just above the bottom 3 of the pot in order to prevent the solid food being cooked from resting upon said bottom 3 and being burned or scorched. The trays 8, 9, are preferably constructed of perforated sheet metal while the tray 10 is preferably constructed of woven wire, as clearly shown in Fig. 1.

Arranged upon one side of the pot at a suitable distance above its bottom is a funnel shaped filling spout 11 through which water may be introduced into the pot. This spout is adapted to be closed by a removable plug 12 so as to prevent the escape of steam when food is being cooked. Upon the opposite side of the pot adjacent to its bottom is a drawoff valve or cock 13 in rear of which is arranged suitable guides 14 for removable slides or strainers 15, 16, 17. The strainer 15 is in the form of a perforated sheet metal plate and is used for straining liquids from comparatively large or coarse vegetables or the like and the strainer 16 is constructed of woven wire fabric of fine mesh so that it may be used for straining broths, jellies, and the like. The part 17 is a solid plate which may be inserted in the guides 14 in place of one of the strainers to close the inner end of the cock and prevent the entrance of preserves or other semi-solid foods which are being cooked in the pot. The plates or strainers 15, 16, 17, are retained in the guides 14 by the engagement of spring detents 18 formed upon the upper ends of the guides and adapted to engage projections or seats 19 upon said slides, as clearly shown in the drawings.

In order to permit the pot to be conveniently carried and moved about upon the stove I provide a bail handle 20 which is pivoted adjacent to its open top. The latter may be closed by a flat cover 21 as shown in Fig. 1, or by a dome-shaped cover 22, as shown in Fig. 2. The cover 22 is used when a ham, turkey, or other large portion of food is being steamed or cooked. In Fig. 2 is shown a basket or pan 23 constructed of perforated or other foraminous metal and adapted to be used when it is desired to fry doughnuts, potatoes, fritters and the like. This basket may be supported upon any of the trays 8, 9, 10 or upon the bottoms 3 of the pot and it is preferably provided upon its bottom with feet 24 to space it above the support on which it rests. The basket is also provided with a pivoted bail handle 25 which may be secured in an upright position by a set screw 26 arranged in an offset end 27 of the handle and adapted to impinge against one side of the basket, as shown.

In order to permit eggs to be boiled, cups of custard or the like to be cooked or steamed, etc., I preferably provide a removable tray 28 which may be supported upon one of the trays 8, 9, 10. This tray 28 comprises an annular rim within which are arranged parallel cross bars 29 which contain circular cups or pockets 30, as shown in Fig. 3.

From the foregoing it will be seen that my improved cooker or steamer may be used for a great variety of purposes and that a number of different kinds of food may be simultaneously boiled, steamed or cooked in it. For instance, soup or a boiled dinner may be contained in the lower portion of the pot while potatoes and other vegetables may be steamed and cooked upon the upper trays 9, 10. The lower tray 8 is especially adapted for supporting meat or other solid foods above the bottom of the pot so that there will be no danger of such solid food scorching or burning. The tray 9 is especially designed for supporting vegetables of all kinds and for puddings, dumplings and the like, and the uppermost tray 10 is made of fine wire gauze so that rice or the like may be supported upon it while being steamed. It will, of course, be understood that one or more of the trays may be used, and that for them may be substituted the basket 23 or the tray 28. When it is desired to make preserves the trays 8, 9, 10 are removed and the solid plate 17 is used to close the cock or valve 13. In making jelly the plate 17 may be replaced by wire gauze strainer 16.

The device may also be used as a water cooler and refrigerator since the ice and water may be placed in the lower portion of the pot and the food to be kept cool upon the trays 9, 10.

Having thus described my invention what I claim is:

A culinary utensil comprising a body or pot, a drawoff cock adjacent to the bottom thereof, guides upon the interior of the pot, a removable slide slidably engaged with said guides and adapted to cover the inlet to said cock, spring detents upon said guides and keeper seats or projections upon said slide to be engaged by said detents.

In testimony whereof I hereunto affix my signature in the presence of two witnesses.

PAUL WIRTHLIN.

Witnesses:
   M. L. GARITY,
   E. H. PULNER.